(12) United States Patent
Sato (10) Patent No.: US 12,553,373 B2
(45) Date of Patent: Feb. 17, 2026

(54) VEHICLE DIAGNOSTIC DEVICE

(71) Applicant: TOYOTA JIDOSHA KABUSHIKI KAISHA, Toyota (JP)

(72) Inventor: Masahiro Sato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/036,482

(22) Filed: Jan. 24, 2025

(65) Prior Publication Data

US 2025/0297567 A1 Sep. 25, 2025

(30) Foreign Application Priority Data

Mar. 21, 2024 (JP) ................. 2024-045426

(51) Int. Cl.
*F01N 11/00* (2006.01)
*F01N 3/031* (2006.01)

(52) U.S. Cl.
CPC ............ *F01N 11/002* (2013.01); *F01N 3/031* (2013.01); *F01N 2410/08* (2013.01); *F01N 2900/0422* (2013.01); *F01N 2900/1406* (2013.01)

(58) Field of Classification Search
CPC .... F01N 3/031; F01N 11/002; F01N 2410/00; F01N 2900/0422; F01N 2900/1406
See application file for complete search history.

(56) References Cited

U.S. PATENT DOCUMENTS

2006/0288693 A1* 12/2006 Endo ............... F01N 3/0842
60/297
2020/0284181 A1* 9/2020 Matsumoto ........... F01N 11/002

FOREIGN PATENT DOCUMENTS

DE 102011003748 A1 * 8/2012 ........... F02D 41/222
JP 2020-143595 A 9/2020

* cited by examiner

*Primary Examiner* — Ngoc T Nguyen
(74) *Attorney, Agent, or Firm* — SoraIP, Inc.

(57) ABSTRACT

A vehicle diagnostic device for diagnosing a pressure sensor, which is used in a vehicle including: an engine mounted on an exhaust pipe with a filter for collecting particulate matter; a pressure piping branching from an upstream side of the filter of the exhaust pipe and bypassing the filter and connecting to a downstream side of the filter; and a pressure sensor mounted on the pressure piping and detecting a pressure of air in the pressure piping, wherein the execution of the diagnosis of the vehicle using the pressure sensor is prohibited, and in a case where freezing of water in the pressure piping is estimated, the execution of the diagnosis of the vehicle using the pressure sensor is permitted when the integrated value of the time traveled at a low speed exceeds the time determination value after the warm-up of the exhaust pipe is completed.

4 Claims, 6 Drawing Sheets

VEHICLE DIAGNOSTIC DEVICE

CROSS-REFERENCE TO RELATED APPLICATION

This application claims priority to Japanese Patent Application No. 2024-045426 filed on Mar. 21, 2024, incorporated herein by reference in its entirety.

BACKGROUND

1. Technical Field

The present disclosure relates to a vehicle diagnostic device.

2. Description of Related Art

Conventionally, a device that determines freezing of water in a pressure piping has been proposed, as a vehicle diagnostic device of this type (for example, refer to Japanese Unexamined Patent Application Publication No. 2020-143595 (JP 2020-143595 A)). The vehicle diagnostic device is used in a vehicle that includes an engine, a pressure piping that is branched from an upstream side of a filter of an exhaust pipe, bypasses the filter, and connects to a downstream side of the filter, and a pressure sensor. The engine has a filter attached to the exhaust pipe, the filter collecting particulate matter. The pressure sensor is attached to the pressure piping and detects a differential pressure between the upstream side and the downstream side of the filter. In the device, a received heat amount from the exhaust pipe to the pressure piping is estimated based on an intake air amount and an exhaust temperature that is a temperature in the exhaust pipe, and a heat dissipation amount of the pressure piping is estimated based on a vehicle speed and an outside air temperature. Also, after the device determines freezing of water in the pressure piping based on an outside air temperature or a coolant temperature of the engine, the device determines unfreezing of water in the pressure piping when an integrated value of values obtained by subtracting the heat dissipation amount from the received heat amount exceeds a fusion heat amount in the pressure piping.

SUMMARY

The vehicle diagnostic device estimates a received heat amount and a heat dissipation amount of the pressure piping immediately before determining unfreezing of the pressure piping, and determines unfreezing of the pressure piping from the estimated received heat amount and heat dissipation amount of the pressure piping. However, an estimation of the received heat amount and the heat dissipation amount of the pressure piping immediately before determining unfreezing of the pressure piping has a large error, and the presence or absence of freezing of water in the pressure piping is unable to be accurately determined. Accordingly, when a vehicle state is to be diagnosed by using a pressure sensor, an appropriate diagnosis may not be possible.

A vehicle diagnostic device of the present disclosure has a main objective to more accurately execute a diagnosis of a vehicle using a pressure sensor.

In order to achieve the main objective, the vehicle diagnostic device of the present disclosure adopts the following technique.

A vehicle diagnostic device of the present disclosure is used in a vehicle and performs a diagnosis of the vehicle by using a pressure sensor, the vehicle including an engine in which a filter is attached to an exhaust pipe, the filter collecting particulate matter, a pressure piping that branches from an upstream side of the filter of the exhaust pipe, bypasses the filter, and connects to a downstream side of the filter, and a pressure sensor that is attached to the pressure piping and detects a differential pressure between the upstream side and the downstream side of the filter, in which when execution of a diagnosis of the vehicle using the pressure sensor is prohibited and freezing of water in the pressure piping is estimated, the vehicle diagnostic device permits execution of a diagnosis of the vehicle using the pressure sensor when an integrated value of time traveled at a predetermined vehicle speed or less exceeds a time determination value after warming up of the exhaust pipe is finished.

In the vehicle diagnostic device of the present disclosure, when freezing of water in the pressure piping is estimated, the vehicle diagnostic device permits execution of a diagnosis of the vehicle using the pressure sensor when an integrated value of time traveled at a low speed exceeds a time determination value after warming up of the exhaust pipe is finished. When the integrated value of time traveled at a low speed exceeds the time determination value after warming up of the exhaust pipe is finished, there will be an environment in which heat of the exhaust pipe after warming up is sufficiently transmitted to the pressure piping and the temperature of the pressure piping is not lowered even by a traveling wind. Therefore, it is considered that the temperature of the pressure piping rises, freezing of water in the pressure piping is eliminated, and the vehicle can appropriately perform a diagnosis by using the pressure sensor. Therefore, when the integrated value of time traveled at a low speed exceeds the time determination value after warming up of the exhaust pipe is finished, the vehicle diagnostic device permits execution of a diagnosis of the vehicle using the pressure sensor. As a result, a diagnosis of the vehicle using the pressure sensor can be more appropriately performed. Here, an upper limit value of a vehicle speed at which heat dissipation by a traveling wind of the pressure piping becomes comparatively smaller than received heat from the exhaust pipe can be exemplified as a "predetermined vehicle speed". A value set in advance as a time threshold to determine whether or not there is a long time period when a traveling wind is small to the extent that ice in the pressure piping melts can be exemplified as a "time determination value".

In the vehicle diagnostic device of the present disclosure, when an integrated value of an intake air amount of the engine becomes equal to or more than a second determination value, the vehicle diagnostic device may determine that warming up of the exhaust pipe has finished. When the integrated value of the intake air amount of the engine is large, it is considered that the temperature of the exhaust pipe is high compared to when the integrated value is small. Therefore, when the integrated value of the intake air amount of the engine becomes equal to or more than the air amount determination value, the vehicle diagnostic device can appropriately determine finishing of warming up of the exhaust pipe by determining that warming up of the exhaust pipe has finished. Here, a value set in advance as a threshold of the integrated value of the intake air amount to determine whether or not warming up of the exhaust pipe has finished can be exemplified as an "air amount determination value".

Moreover, in the vehicle diagnostic device of the present disclosure, when execution of a diagnosis of the vehicle using the pressure sensor is permitted and freezing of the pressure piping is estimated, the vehicle diagnostic device may prohibit execution of a diagnosis of the vehicle using the pressure sensor when an integrated value of time traveled at a predetermined low load exceeds a low load time determination value. When freezing of water in the pressure piping is estimated, warming up of the exhaust pipe does not proceed and a rise in the temperature of the exhaust pipe is suppressed, compared to when a time of traveling in a predetermined low load state is long or short, and the pressure piping is unable to be sufficiently warmed up. Accordingly, there is a possibility that water in the pressure piping freezes, and a diagnosis of the vehicle using the pressure sensor is erroneously performed. Therefore, when execution of a diagnosis of the vehicle using the pressure sensor is permitted and freezing of water in the pressure piping is estimated, the integrated value of time traveled at a predetermined low load may exceed a low load time determination value. In this case, an erroneous diagnosis using the pressure sensor can be suppressed, by prohibiting execution of a diagnosis of the vehicle using the pressure sensor. Here, a value set in advance as a threshold to determine whether or not the pressure piping receives heat by warming up of the exhaust pipe and ice inside is melted can be exemplified as a "low load time determination value".

In this case, the predetermined low load may be a state in which the engine is operated with an intake air amount less than a threshold and a vehicle speed is equal to or more than a predetermined high vehicle speed. In this way, the vehicle diagnostic device can more appropriately determine whether or not warming up of the exhaust pipe is proceeding. Here, a value set in advance as a threshold to determine whether or not the engine is under a low load can be exemplified as a "threshold". A threshold to determine whether or not a traveling wind is large is a "predetermined high vehicle speed".

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
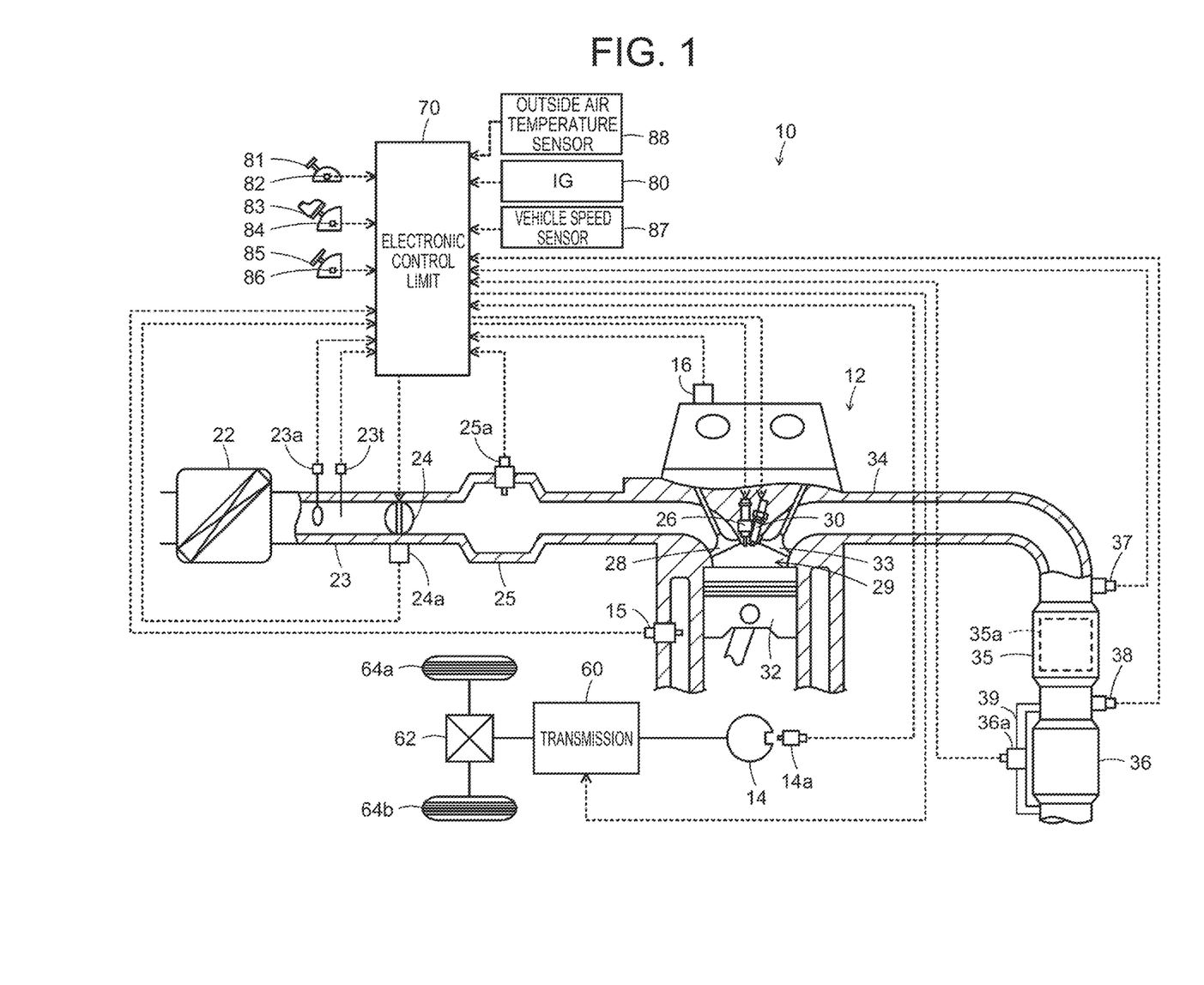
FIG. 1 is a schematic configuration diagram of an automobile 10 equipped with a vehicle diagnostic device according to an embodiment of the present disclosure.

Embodiments of the present disclosure will be described with reference to the drawings. FIG. 1 is a schematic configuration diagram of an automobile 10 in which a vehicle diagnostic device according to an embodiment of the present disclosure is mounted. The automobile 10 of the embodiment includes, as shown, an engine 12, a starter (not shown) for cranking the engine 12, a transmission 60, and an electronic control unit 70 as a control device for controlling the entire automobile.

The engine 12 is configured as a multi-cylinder internal combustion engine that outputs power by four strokes of intake, compression, expansion (explosion combustion), and exhaust using fuel such as gasoline and gas oil. The engine 12 includes an in-cylinder injection valve 26 that is injected into the combustion chamber 29 and a spark plug 30. The in-cylinder injection valve 26 is disposed substantially in the center of the top portion of the combustion chamber 29, and injects fuel in a spray shape. The spark plug 30 is disposed in the vicinity of the in-cylinder injection valve 26 so as to be able to ignite the fuel sprayed from the in-cylinder injection valve 26 in a spray shape.

The engine 12 sucks the air cleaned by the air cleaner 22 into the intake pipe 23 and passes the throttle valve 24 and the surge tank 25 in this order. Further, the engine 12 sucks air into the combustion chamber 29 via the intake valve 28, divides the air into one or a plurality of fuel injections from the in-cylinder injection valve 26 in an intake stroke or a compression stroke, and explodes and burns the air by ignition by the spark plug 30. Then, the reciprocating motion of the piston 32 depressed by the energy caused by the explosive combustion is converted into the rotational motion of the crankshaft 14. The exhaust gas discharged from the combustion chamber 29 to the exhaust pipe 34 via the exhaust valve 33 is discharged to the outside air via the control device 35 and PM filters 36 incorporated in the exhaust pipe 34. The control device 35 includes a control catalyst (three-way catalyst) 35a for purifying harmful components of carbon monoxide (CO), hydrocarbons (HC), and nitrogen oxides (NOx) in the exhaust gas. PM filter 36 is formed as a porous filter made of ceramics, stainless-steel, or the like, and collects particulate matter (PM: Particulate Matter) such as soot in the exhaust gas. Instead of PM filters 36, a quaternary catalyst that combines the purification function of the three-way catalyst and the collection function for particulate matter may be used.

The transmission 60 is configured as an automatic transmission such as a four-stage transmission, a five-stage transmission, and a six-stage transmission. The transmission 60 is connected to the crankshaft 14 of the engine 12 and is connected to the drive wheels 64a, 64b via a differential gear 62, and transmits power from the engine 12 to the drive wheels 64a, 64b with a change in the gear range.

The electronic control unit 70 includes a microcomputer, and the microcomputer includes a CPU, a ROM, RAM, a flash memory, an input/output port, and a communication port. The electronic control unit 70 receives signals from various sensors via input ports. For example, the electronic control unit 70 receives the crank angle θcr from the crank position sensor 14a and the coolant temperature Tw from the water temperature sensor 15 that detects the temperature of the cooling water of the engine 12. The crank position sensor 14a detects the rotational position of the crankshaft 14 of the engine 12. The electronic control unit 70 also receives the cam angles θci and θco from the cam position sensor 16 that detects the rotational position of the intake camshaft that opens and closes the intake valve 28 and the rotational position of the exhaust camshaft that opens and closes the exhaust valve 33. The electronic control unit 70 also receives the intake air amount Qa from the air flow meter 23a and the intake air temperature Tqa from the temperature sensor 23t mounted on an upstream side of the throttle valve 24 of the intake pipe 23. The air flow meter 23a is mounted on an upstream side of the throttle valve 24 of the intake pipe 23. The electronic control unit 70 also receives a throttle opening degree TH from the throttle position sensor 24a that detects the position (opening degree) of the throttle valve 24 and a surge pressure Ps from the pressure sensor 25a attached to the surge tank 25. The electronic control unit 70 also receives the front air-fuel ratio AF1 from the front air-fuel ratio sensor 37 mounted on am upstream side of the control device 35 of the exhaust pipe 34. The electronic control unit 70 also receives the rear air-fuel ratio AF2 from the rear air-fuel ratio sensor 38 mounted between the control device 35 of the exhaust pipe 34 and ΔM filters 36. Furthermore, the electronic control unit 70 also receives a differential pressure ΔP from a differential pressure sensor 36a that detects a differential pressure (differential pressure between the upstream side and the downstream side) before and after PM filters 36. The differential pressure sensor 36a is attached to a pressure piping 39 that branches from the upstream side of PM filter 36 of the exhaust pipe 34, bypasses PM filter 36, and connects to the downstream side of PM filter 36. The electronic control unit 70 also receives the rotational speed Nin from the rotational speed sensor attached to the input shaft of the transmission 60 and the rotational speed Nout from the rotational speed sensor attached to the output shaft of the transmission 60. The electronic control unit 70 also receives the ignition IG from the ignition switch 80 and the shift position SP from the shift position sensor 82 that detects the operating position of the shift lever 81. The electronic control unit 70 also receives an accelerator operation amount Acc from the accelerator pedal position sensor 84 that detects the depression amount of the accelerator pedal 83. The electronic control unit 70 also receives the brake pedal position BP from the brake pedal position sensor 86 that detects the depression amount of the brake pedal 85. Further, the electronic control unit 70 also receives the vehicle speed V from the vehicle speed sensor 87 and the outside air temperature Ta from the outside air temperature sensor 88 that detects the outside air temperature.

The electronic control unit 70 outputs various control signals via an output port. For example, the electronic control unit 70 outputs control signals to the throttle valve 24, the in-cylinder injection valve 26, and the spark plug 30 of the engine 12. The electronic control unit 70 also outputs control signals to the starter and the transmission 60.

The electronic control unit 70 calculates the rotational speed Ne of the engine 12 based on the crank angle θcr from the crank position sensor 14a. The electronic control unit 70 calculates the load factor KL of the engine 12 based on the intake air amount Qa from the air flow meter 23a and the rotational speed Ne of the engine 12. The load factor KL is defined as the ratio of the volume of air actually drawn in a cycle to the stroke volume per cycle of the engine 12. The electronic control unit 70 estimates the temperature Tc of the catalyst 35a of the control device 35 based on the coolant temperature Tw from the water temperature sensor 15, the rotational speed Ne of the engine 12, and the load factor KL. The electronic control unit 70 calculates PM deposition amount Qpm as the deposition amount of the particulate matter deposited on PM filters 36 based on the differential pressure ΔP from the differential pressure sensor 36a. Further, the electronic control unit 70 calculates the thermal Tf of PM filters 36 based on the rotational speed Ne and the load factor KL of the engine 12.

In the automobile 10 of the embodiment, the electronic control unit 70 basically controls the engine 12 and the transmission 60 as follows. The electronic control unit 70 sets the target gear range Gs* of the transmission 60 based on the accelerator operation amount Acc and the vehicle speed V, and controls the transmission 60 so that the gear range Gs of the transmission 60 becomes the target gear range Gs*. The electronic control unit 70 sets the target torque Te* of the engine 12 based on the accelerator operation amount Acc, the vehicle speed V, and the gear range Gs of the transmission 60. Further, the electronic control unit 70 controls the operation of the engine 12 (for example, intake air amount control, fuel injection control, ignition control, and the like) so that the engine 12 is operated based on the target torque Te*.

Figure 2:
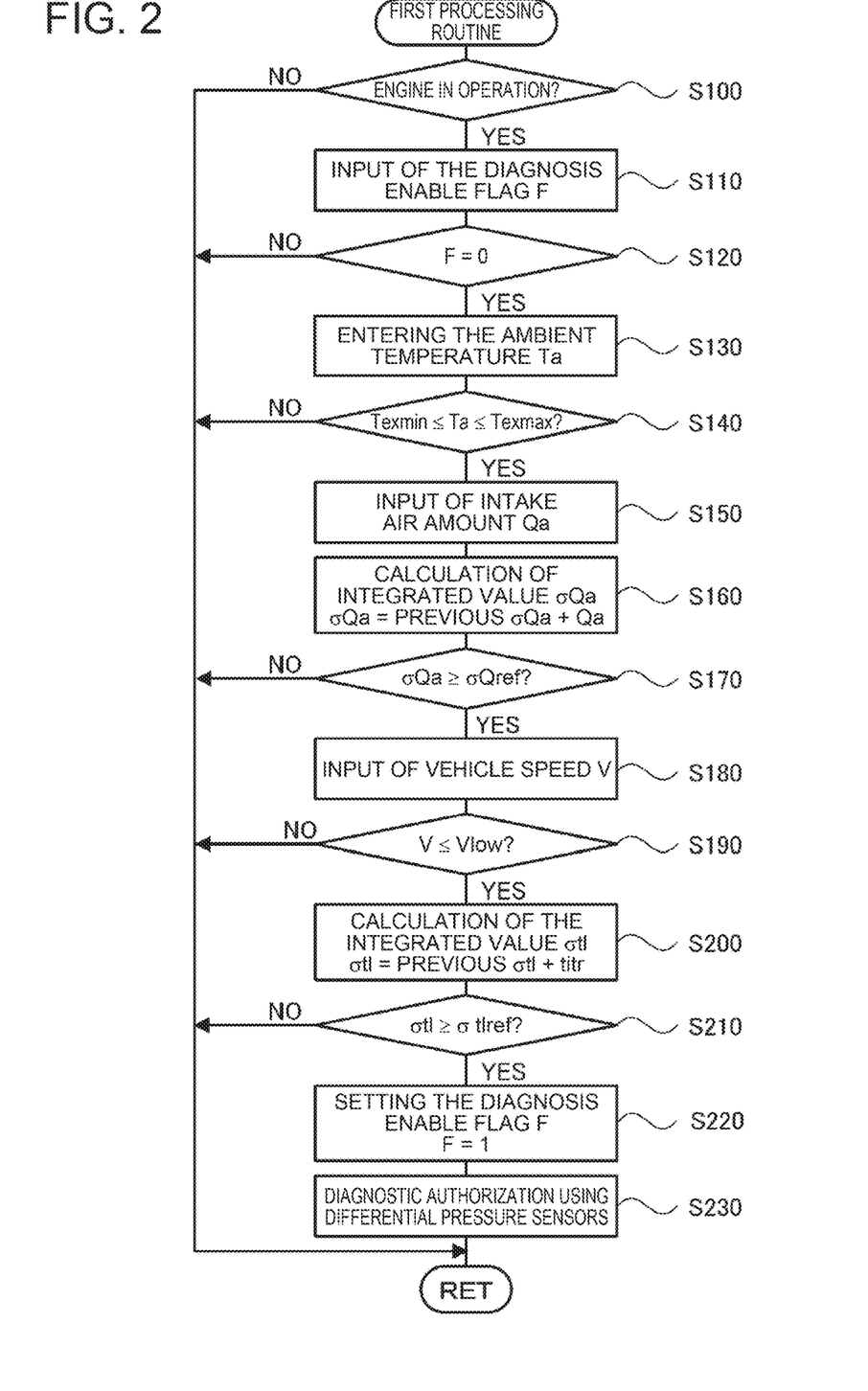
FIG. 2 is a flowchart illustrating an example of a first processing routine executed by the electronic control unit 70.

Next, the operation of the automobile 10 according to the embodiment, in particular, the operation when executing the diagnostics of the vehicle using the differential pressure sensor 36a is permitted or not permitted will be described. FIG. 2 is a flowchart illustrating an example of a first processing routine executed by the electronic control unit 70. The first process routine is repeatedly executed every titr (for example, several msec) for a predetermined period after the automobile 10 is activated. As a diagnosis of vehicles using the differential pressure sensor 36a, for example, an abnormal diagnosis of PM filters 36 based on the differential pressure ΔP from the differential pressure sensor 36a is exemplified.

When the first process routine is executed, CPU of the electronic control unit 70 executes a process of determining whether the engine 12 is in operation (S100). When the engine 12 is not in operation, the first processing routine is ended.

When the engine 12 is in operation, a diagnosis permission flag F is inputted (S110). The diagnosis permission flag F is a flag set by a S220 or a S410 described later. The diagnosis permission flag F is set to a value 1 when the execution of diagnosis using the differential pressure sensor 36a described above is permitted, and is set to a value 0 when the execution of diagnosis using the differential pressure sensor 36a is prohibited. When the diagnosis permission flag F is 1 in S110, that is, when the diagnosis using the differential pressure sensor 36a is permitted to be executed, the first process is ended.

When the diagnosis permission flag F is 0 in S110, that is, when the diagnosis using the differential pressure sensor 36a is prohibited, the outside air temperature Ta from the outside air temperature sensor 88 is inputted (S130). Then, it is determined whether or not the outside air temperature Ta is equal to or higher than the execution lower limit Texmin (for example, −17° C., −15° C., −13° C., or the like) and is equal to or lower than the execution upper limit Texmax (for example, −1° C., −0.5° C., 0° C., or the like) (S140). The execution lower limit Texmin is a temperature set in advance by experimentation, analysis, machine-learning, or the like as a lower limit of a temperature suitable for executing diagnostics of vehicles using the differential pressure sensor 36a. The execution upper limit Texmax is a temperature set in advance by experimentation, analysis, machine learning, or the like as an upper limit of a temperature at which water such as condensed water in the pressure piping 39 freezes. When it is determined in S140 that the outside air temperature Ta is less than the execution lower limit Texmin and is not suitable for executing diagnostics using the differential pressure sensor 36a, the first process routine is ended. Also, when it is determined that the outside air temperature Ta is higher than the execution upper limit Texmax and the water in the pressure piping 39 is not frozen, the first process routine is terminated.

In S140, when the outside air temperature Ta is within a range from the execution lower limit Texmin to the execution upper limit Texmax, it is suitable for executing diagnostics using the differential pressure sensor 36a, and the freezing of the water in the pressure piping 39 is estimated. At this time, the intake air amount Qa from the air flow meter 23a is inputted (S150). Then, the integrated value σQa of the intake air amount Qa is calculated (S160). The integrated value σQa is calculated by adding the intake air amount Qa inputted in the present S150 to the integrated value (last time) σQa calculated when the previous S160 is executed. When S160 is executed for the first time after the vehicle is started, σQa is set to 0.

Then, it is determined whether or not the integrated value σQa is equal to or larger than the air amount determination value σQref (S170). The air amount determination value σQref is a value set in advance by experiment, analysis, machine learning, or the like as a threshold value of the integrated value of the intake air amount for determining whether or not the warm-up of the exhaust pipe 34 has ended. When the integrated value σQa is less than the air amount determination value σQref, it is determined that the warm-up of the exhaust pipe 34 has not ended, and the first processing routine is ended.

When the integrated value σQa is equal to or larger than the air amount determination value σQref in S170, it is determined that the warm-up of the exhaust pipe 34 is completed, and the vehicle speed V is subsequently inputted from the vehicle speed sensor 87 (S180). Then, it is determined whether or not the vehicle speed V is equal to or less than the threshold Vlow (predetermined vehicle speed) (S190). The threshold value Vlow is a value set in advance by experimentation, analysis, machine learning, or the like as an upper limit value of the vehicle speed V at which the heat dissipation amount by the traveling air of the pressure piping 39 is smaller than the received heat amount from the exhaust pipe 34. When the vehicle speed V exceeds the threshold Vlow, it is determined that the heat dissipation amount by the traveling air of the pressure piping 39 exceeds the received heat amount from the exhaust pipe 34 and the unfreezing of the water in the pressure piping 39 cannot be performed, and the first process routine is ended.

When the vehicle speed V is equal to or lower than the threshold Vlow in S190, it is determined that the heat dissipation amount by the traveling air of the pressure piping 39 is smaller than the received heat amount from the exhaust pipe 34, and the integrated value σtl of the time traveled below the threshold Vlow is calculated (S200). The integrated value σtl is calculated by adding a predetermined period titr, which is an execution interval of the first process routine, to the integrated value (last time) σtl calculated when the previous S200 is executed. When S200 is executed for the first time after the activation of the vehicle, σtl is set to 0.

Then, it is determined whether or not the integrated value σtl is equal to or greater than the time determination value σtlref (S210). The time determination value σtlref is a threshold value for determining whether or not a period in which the traveling wind is small is long to such an extent that the ice in the pressure piping 39 melts. The time determination value σtlref is set to be larger than the time when the outside air temperature Ta entered in S130 is lower. When the integrated value σtl is less than the time determination value σtlref, it is determined that the ice in the pressure piping 39 remains without melting and is not suitable for diagnosing using the differential pressure sensor 36a, and the first process routine is ended.

When the integrated value σtl is equal to or larger than the time determination value σtlref, it is determined that the ice is melted in the pressure piping 39 and is suitable for diagnosis using the differential pressure sensor 36a, and the diagnosis permission flag F is set to the value 1 (S220). Then, 36a of the differential pressure sensor is permitted to execute diagnostics, and the first process routine is ended (S230). When the execution of the diagnosis using the differential pressure sensor 36a is permitted, the electronic control unit 70 executes the diagnosis of the vehicle using the differential pressure sensor 36a at a predetermined timing.

Figure 3:
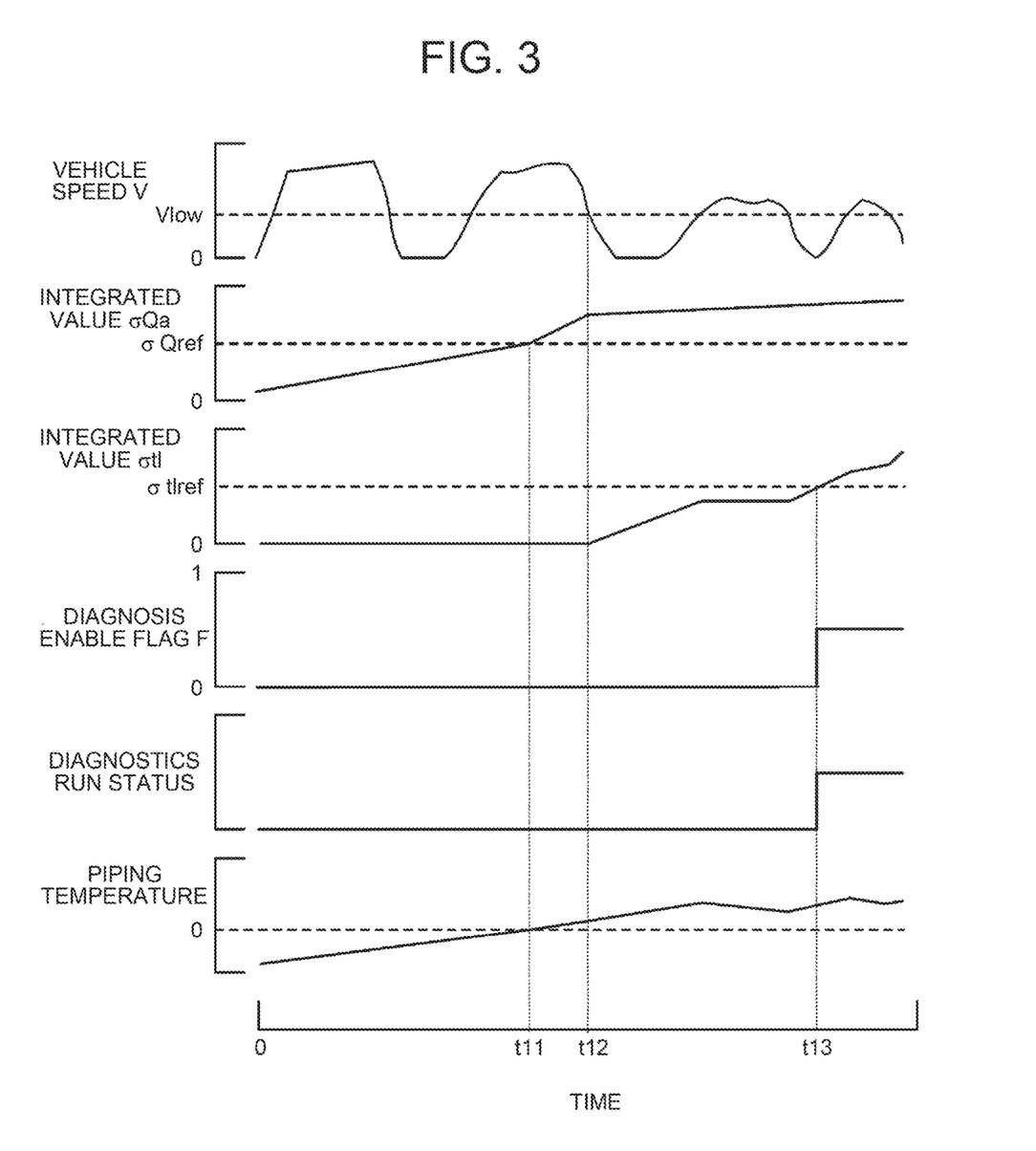
FIG. 3 is an explanatory diagram illustrating an exemplary temporal change in the vehicle speed V, the integrated value σQa, the integrated value σtl, the diagnosis permission flag F, the execution status of the diagnosis using the differential pressure sensor 36a, and the pipe temperature as the temperature of the pressure piping 39 in the urban area running in the urban area.
Figure 4:
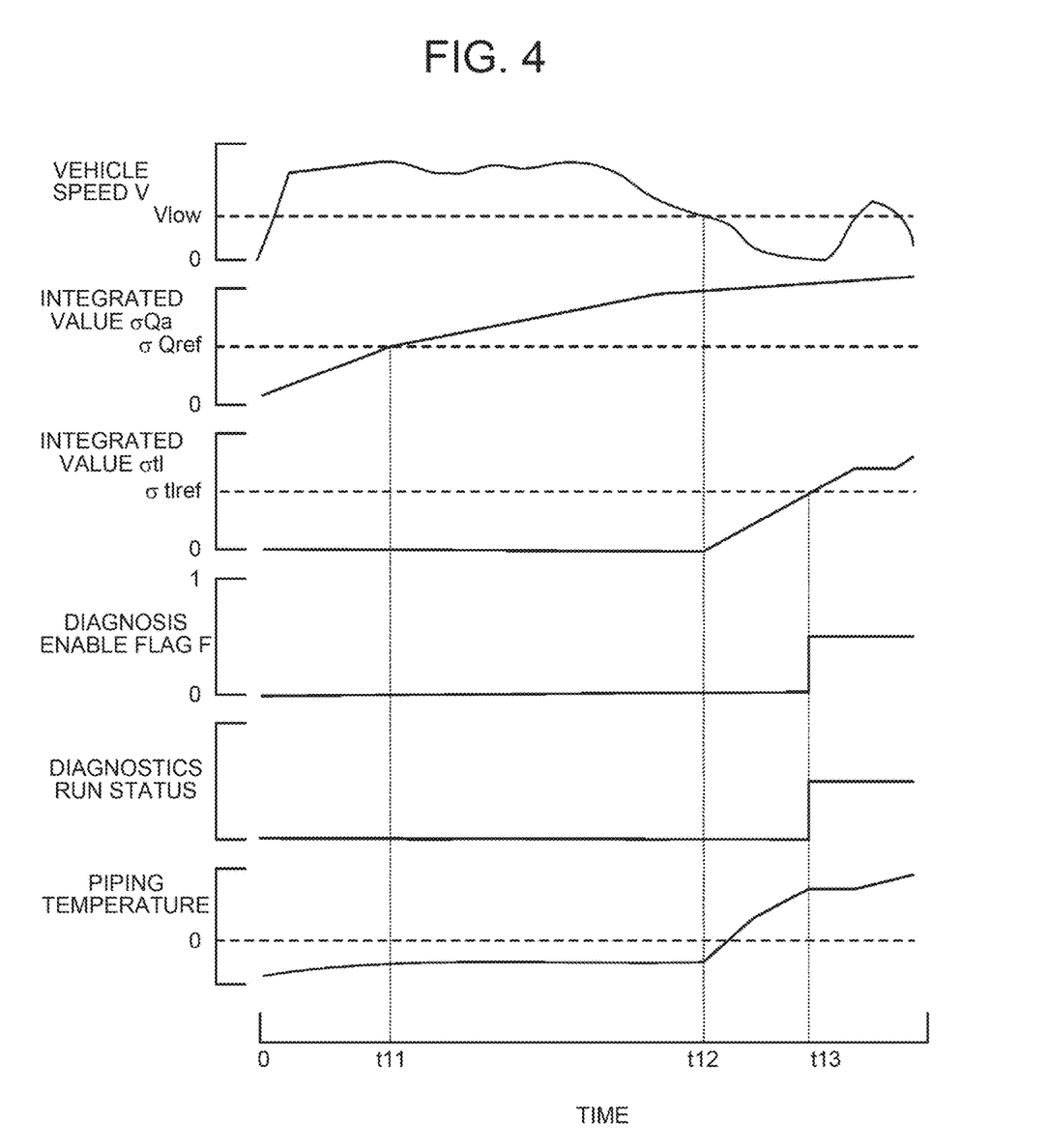
FIG. 4 is an explanatory diagram illustrating an exemplary temporal change in the pipe temperature as the vehicle speed V, the integrated value σQa, the integrated value σtl, the diagnosis permission flag F, the execution status of diagnosis using the differential pressure sensor 36a, and the temperature of the pressure piping 39 in the high-speed running on the expressway.

FIG. 3 is an explanatory diagram illustrating an exemplary temporal change in the vehicle speed V, the integrated value σQa, the integrated value σtl, the diagnosis permission flag F, the execution status of the diagnosis using the differential pressure sensor 36a, and the pipe temperature as the temperature of the pressure piping 39 in the urban area traveling in the urban area. FIG. 4 is an explanatory diagram illustrating an exemplary temporal change in the pipe temperature as the vehicle speed V, the integrated value σQa, the integrated value σtl, the diagnosis permission flag F, the execution status of the diagnosis using the differential pressure sensor 36a, and the temperature of the pressure piping 39 in the high-speed running on the expressway. In urban driving, as shown in FIG. 3, the integrated value σQa increases while stopping and accelerating repeatedly. Since the vehicle speed V is not so high as a whole in urban driving, the traveling wind is not large, and the piping temperature rises as the integrated value σQa increases. On the other hand, in the high-speed traveling, as shown in FIG. 4, traveling at a relatively high vehicle speed V continues and the load is high, so that the integrated value σQa exceeds the air amount determination value σQref at an earlier timing than in the urban traveling. However, since the vehicle speed V is high as a whole, the traveling wind tends to be large, and the speed of the increase in the piping temperature tends to be slower than that of the urban driving. As described above, the piping temperature varies depending on the magnitude of the integrated value σQa and the vehicle speed V. In the embodiment, when the integrated value σQa exceeds the air amount determination value σQref during traveling for a certain period of time, it is determined that the warm-up of the exhaust pipe 34 is completed (time t11). When the vehicle speed V becomes equal to or lower than the threshold Vlow, integration of the integrated value σtl is started (time t12). Then, when the integrated value σtl becomes equal to or larger than the time determination value σtlref, it is determined that the piping temperature becomes sufficiently high and the ice in the pressure piping 39 is melted, and the diagnostics of the vehicles using the differential pressure sensor 36a is permitted. Accordingly, it is possible to more appropriately diagnose vehicles using the differential pressure sensor 36a.

Figure 5:
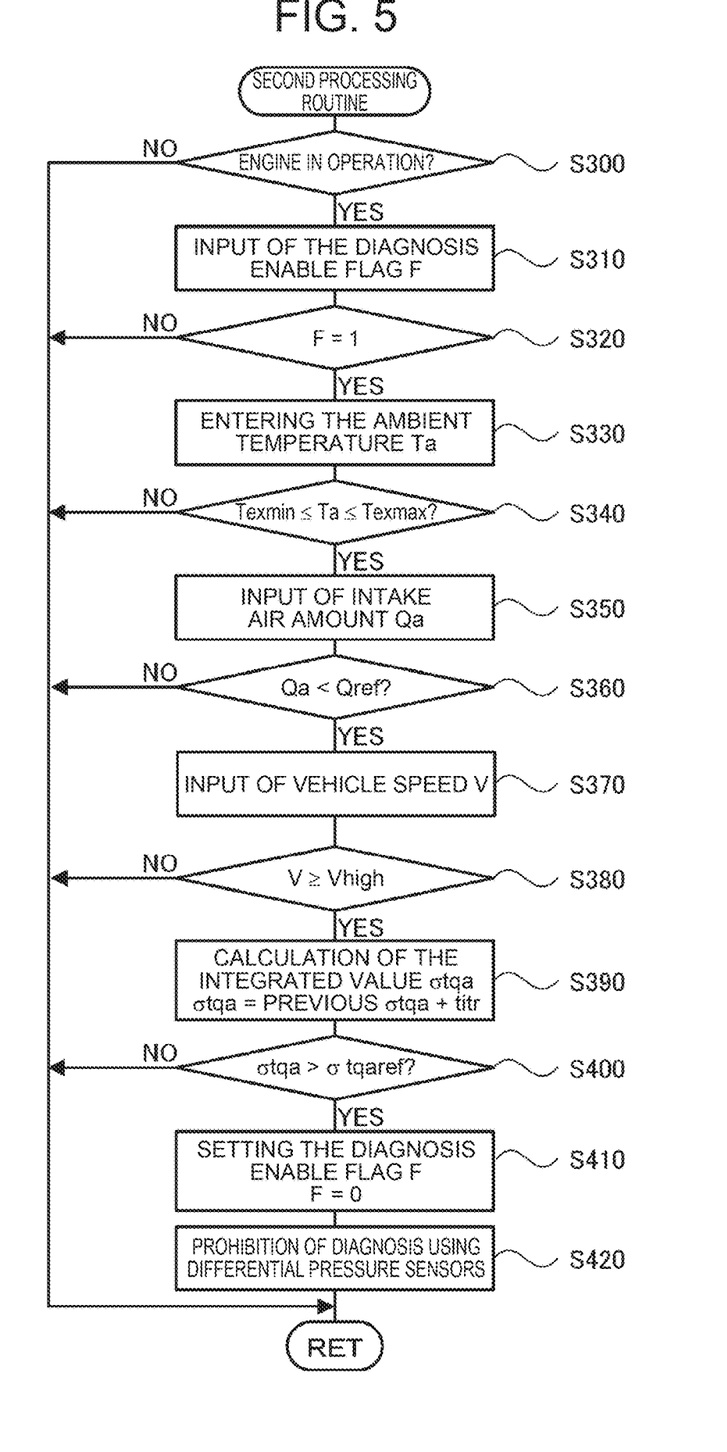
FIG. 5 is a flow chart illustrating an exemplary second process routine executed by the electronic control unit 70.

Next, an operation when the diagnosis permission flag F is the value 1 will be described. FIG. 5 is a flowchart illustrating an example of a second processing routine executed by the electronic control unit 70. The second process routine is repeatedly executed every titr (for example, several msec) for a predetermined period after the automobile 10 is activated.

When the second processing routine is executed, CPU of the electronic control unit 70 determines whether or not the engine 12 is in operation by the same processing as S100 of the first processing routine (S300). When the engine 12 is not in operation, the second processing routine is ended.

When the engine 12 is in operation in S300, the diagnosis permission flag F is inputted in the same process as in S110 of the first process routine (S310). Then, it is determined whether or not the diagnosis permission flag F is equal to 1 (S320). When the diagnosis permission flag F is 0 in S320, that is, when the diagnosis of the vehicle using the differential pressure sensor 36a is prohibited, the second process is ended. When the diagnosis permission flag F is the value 1 in S320, that is, when the diagnosis of the vehicle using the differential pressure sensor 36a is permitted to be executed, the outside air temperature Ta from the outside air temperature sensor 88 is inputted from S130 in the same process as in S150 (S330). Then, it is determined whether or not the outside air temperature Ta is equal to or higher than the execution lower limit Texmin and equal to or lower than the execution upper limit Texmax (S340). When the outside air temperature Ta is equal to or higher than the execution lower limit Texmin and equal to or lower than the execution upper limit Texmax, the intake air amount Qa from the air flow meter 23a is inputted (S350).

Next, it is determined whether or not the intake air amount Qa is less than the threshold Qref (S360), and the vehicle speed V is inputted (S370). It is determined whether or not the vehicle speed V is equal to or higher than the predetermined high vehicle speed Vhigh (S380). The threshold Qref is a threshold for determining whether or not the engine 12 is operating at low loads, and is determined in advance by experimentation, analysis, and machine learning. The predetermined high vehicle speed Vhigh is a threshold for determining whether or not the traveling wind is large. Even when the intake air amount Qa is greater than or equal to the threshold Qref or even when the intake air amount Qa is less than the threshold Qref, the vehicle speed V may be less than the predetermined high vehicle speed Vhigh. In this case, since the engine 12 is not operated at a low load or the traveling wind is not large, it is determined that there is a low possibility that the temperature of the pressure piping 39 is lowered and the water inside is frozen, and the second processing routine is ended.

When the intake air amount Qa is less than the threshold Qref and the vehicle speed V is equal to or higher than the predetermined high vehicle speed Vhigh from S360 to S380, the engine 12 is operated at a low load and the traveling wind is in a large predetermined low load. Therefore, it is determined that there is a possibility that the temperature of the pressure piping 39 is lowered and the water inside the pressure piping 39 is frozen depending on the running condition of the automobile 10, and the integrated value σtqa is calculated (S390). The integrated value σtqa is an integrated value of the time that the automobile 10 travels in a state where the engine 12 is operated at a low load and the traveling wind is large. The integrated value σtqa is calculated by adding a predetermined time itr, which is the execution time of the second process routine, to the integrated value (previous time) σtqa calculated when the previous S390 is executed. When S390 is executed for the first time after the vehicle is started, σtqa is set to 0.

Next, it is determined whether or not the integrated value σtqa exceeds the low load time determination value σtqaref (S400). The low load time determination value σtqaref is a value determined in advance by experiment, analysis, and machine learning as a threshold value for determining whether or not ice inside the pressure piping 39 is frozen. The low load time determination value σtqaref may be set to be smaller than when the outside air temperature Ta is lower than when the outside air temperature is higher. When the integrated value σtqa is equal to or less than the low load time determination value σtqaref, it is determined that the ice inside the pressure piping 39 is not frozen, and the second processing routine is ended.

When the integrated value σtqa exceeds the low load time determination value σtqaref in S400, it is determined that the ice inside the pressure piping 39 is frozen, and the diagnosis permission flag F is set to the value 0 (S410). Then, the diagnosis using the differential pressure sensor 36a is prohibited (S420), and the second process is ended.

Figure 6:
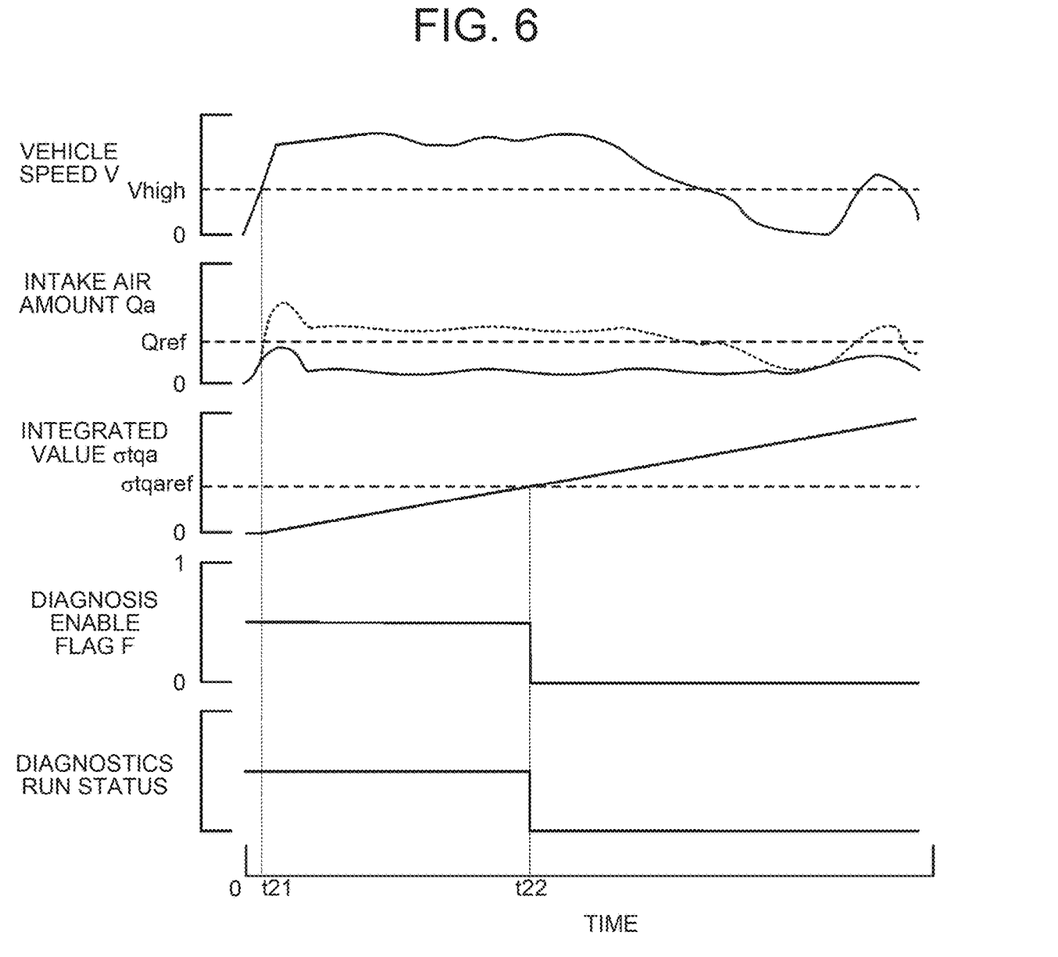
FIG. 6 is an explanatory diagram illustrating an exemplary temporal change in a state in which the diagnosis is executed using the vehicle speed V, the intake air amount Qa, the integrated value σtqa, the diagnosis permission flag F, and the differential pressure sensor 36a at the time of descent.

FIG. 6 is an explanatory diagram illustrating an exemplary temporal change in a state in which the diagnosis is executed using the vehicle speed V, the intake air amount Qa, the integrated value σtqa, the diagnosis permission flag F, and the differential pressure sensor 36a at the time of descent. In the drawing, a broken line represents an exemplary temporal change of the intake air amount Qa when traveling on a flat surface. At the time of descent, as shown in the drawing, it is considered that the automobile 10 has a large chance of traveling while the engine 12 is operated under a low-load condition in which the intake air amount Qa is less than the threshold Qaref, and the vehicle speed V is equal to or higher than the predetermined high vehicle speed Vhigh and the traveling wind is large. In this case, since the received heat amount from the exhaust pipe 34 is small and the amount of cooling by the traveling air is large in the pressure piping 39, the moisture in the pressure piping 39 is easily frozen. In the embodiment, when the intake air amount Qa is less than the threshold Qaref and the vehicle speed V is equal to or higher than the predetermined high vehicle speed Vhigh, the integration of the integrated value σtqa is started (time t21). When the integrated value σtqa becomes larger than the low load time determination value σtqaref, it is determined that the water in the pressure piping 39 is frozen, and the diagnosis using the differential pressure sensor 36a is prohibited (time t22). Accordingly, since the diagnosis using the differential pressure sensor 36a in the condition where the water in the pressure piping 39 is frozen is prohibited, the erroneous diagnosis of the diagnosis using the differential pressure sensor 36a can be suppressed.

According to the automobile 10 equipped with the vehicle diagnostic device of the embodiment described above, the outside air temperature Ta may be equal to or higher than the execution lower limit Texmin and equal to or lower than the execution upper limit Texmax. In this case, when the integrated value σQ is equal to or greater than the air amount determination value σQref and the integrated value σtl is equal to or greater than the time determination value σtlref, the diagnosis using the differential pressure sensor 36a is permitted to be executed. Accordingly, it is possible to more appropriately perform diagnostics using the differential pressure sensor 36a.

In addition, when the execution of the diagnosis using the differential pressure sensor 36a is permitted and the outside air temperature Ta is equal to or higher than the execution lower limit Texmin and equal to or lower than the execution upper limit Texmax, the integrated value σtqa sometimes exceeds the low load time determination value σtqaref. In this case, it is possible to suppress erroneous diagnosis in diagnosis using the differential pressure sensor 36a by prohibiting the diagnosis using the differential pressure sensor 36a.

In the above-described embodiment, it is determined that the warm-up of the exhaust pipe 34 is completed when the integrated value σQa of the intake air amount Qa of the engine 12 is equal to or larger than the air amount determination value σQref in S170. However, instead of the intake air amount Qa, the fuel-injection amount of the engine 12 may be used. In this case, it may be determined that the warm-up of the exhaust pipe 34 has ended when the integrated value of the fuel injection amount is equal to or larger than the predetermined determination value.

In the above-described embodiment, when the outside air temperature Ta is equal to or higher than the execution lower limit Texmin and equal to or lower than the execution upper limit Texmax in S140, the processes after S150 are executed. However, in S140, it is determined whether or not the outside air temperature Ta is equal to or lower than the execution upper limit Texmax, and when the outside air temperature Ta is equal to or lower than the execution upper limit Texmax, S150 and subsequent processes may be executed.

In the above-described embodiment, S350, S360 inputs the intake air amount Qa to determine whether or not the intake air amount Qa is smaller than the threshold Qref. However, S350, S360 may use the fuel-injection amount instead of the intake air amount.

In the above-described embodiment, the time determination value σtlref is set based on the outside air temperature Ta. However, the time determination value σtlref may be set to a fixed value or a value that changes based on at least one of the outside air temperature Ta, the vehicle speed V, and the load of the automobile 10 (the intake air amount Qa, the fuel-injection amount, and the like). Further, the time determination value σtlref may be set as a fixed value regardless of the outside air temperature Ta, the vehicle speed V, and the loads of the automobile 10. For example, when the time determination value σtlref is set to a value that changes based on the vehicle speed V, the time determination value σtlref may be set to be larger than when the vehicle speed V is high and low. Further, when the load of the automobile 10 is small, the time determination value σtlref may be set larger than when the load is large.

In the above-described embodiment, the low load time determination value σtqaref is set based on the outside air temperature Ta. However, the low load time determination value σtqaref may be set to a fixed value or a value that changes based on at least one of the outside air temperature Ta, the vehicle speed V, and the load of the automobile 10 (the intake air amount Qa, the fuel-injection amount, and the like). Further, the low load time determination value σtqaref may be set as a fixed value regardless of the outside air temperature Ta, the vehicle speed V, and the load of the automobile 10. For example, when the low load time determination value σtqaref is set to a value that changes based on the vehicle speed V, the low load time determination value σtqaref may be set to be smaller than when the vehicle speed V is high than when the vehicle speed V is low. In addition, when the load of the automobile 10 is small, the low load time determination value σtqaref may be set to be smaller than when the load is large.

The correspondence between the main elements of the embodiments and the main elements of the disclosure described in the column of the means for solving the problem will be described. In the embodiment, the engine 12 corresponds to the "engine", the pressure piping 39 corresponds to the "pressure piping", the differential pressure sensor 36a corresponds to the "pressure sensor", the automobile 10 corresponds to the "vehicle", and the electronic control unit 70 corresponds to the "vehicle diagnostic device".

The correspondence between the main elements of the embodiment and the main elements of the disclosure described in the section of the means for solving the problem is an example for specifically explaining the embodiment of the disclosure described in the section of the means for solving the problem. Therefore, the elements of the disclosure described in the section of the means for solving the problem are not limited. That is, the interpretation of the disclosure described in the section of the means for solving the problem should be performed based on the description in the section, and the embodiments are only specific examples of the disclosure described in the section of the means for solving the problem.

Although the embodiments for carrying out the present disclosure have been described above, the present disclosure is not limited to such embodiments at all, and it is needless to say that the present disclosure can be carried out in various forms without departing from the gist of the present disclosure.

The present disclosure is applicable to a manufacturing industry of a vehicle diagnostic device and the like.

What is claimed is:

1. A vehicle diagnostic device that is configured to diagnose a vehicle by using a pressure sensor, the vehicle including an engine in which a filter is attached to an exhaust pipe, the filter collecting particulate matter, a pressure piping that branches from an upstream side of the filter of the exhaust pipe, bypasses the filter, and connects to a downstream side of the filter, and the pressure sensor that is attached to the pressure piping and detects a differential pressure between the upstream side and the downstream side of the filter, the vehicle diagnostic device comprising:
a processor configured to:
prohibit diagnosing the vehicle using the pressure sensor when a first condition is satisfied; and
when a second condition is satisfied, allow diagnosing the vehicle using the pressure sensor, the second condition including (i) a condition where freezing of water in the pressure piping is estimated, and (ii) a condition where an integrated value of time traveled at a predetermined vehicle speed or less exceeds a time determination value after warming up of the exhaust pipe is finished.

2. The vehicle diagnostic device according to claim 1, wherein when an integrated value of an intake air amount of the engine becomes equal to or more than an air amount determination value, the processor is configured to determine that warming up of the exhaust pipe is finished.

3. The vehicle diagnostic device according to claim 1, wherein when a third condition is satisfied, the processor is configured to prohibit diagnosing the vehicle using the pressure sensor, the third condition including (i) a condition where freezing of water in the pressure piping is estimated, and (ii) a condition where an integrated value of time traveled at a predetermined low load exceeds a low load time determination value.

4. The vehicle diagnostic device according to claim 3, wherein the predetermined low load is a state in which the engine is operated with an intake air amount less than a threshold amount and a vehicle speed is equal to or more than a predetermined high vehicle speed.

* * * * *